(12) United States Patent
Scullion et al.

(10) Patent No.: US 11,295,356 B2
(45) Date of Patent: Apr. 5, 2022

(54) SYSTEM AND METHODS FOR PROVIDING AND CALCULATING RELOCATION ESTIMATES

(71) Applicant: Telescio, LLC, Jacksonville, FL (US)

(72) Inventors: Mark Scullion, Saint Johns, FL (US); Len O'Neill, Ponte Vedra Beach, FL (US); Jonathan Vu Tran, Anaheim, CA (US); Caryn Knill, St. Augustine, FL (US); Timothy Meyer, Jacksonville, FL (US)

(*) Notice: Subject to any disclaimer, the term of this patent is extended or adjusted under 35 U.S.C. 154(b) by 533 days.

(21) Appl. No.: 16/221,579

(22) Filed: Dec. 16, 2018

(65) Prior Publication Data

US 2019/0197591 A1 Jun. 27, 2019

Related U.S. Application Data

(60) Provisional application No. 62/610,232, filed on Dec. 24, 2017.

(51) Int. Cl.
*G06Q 30/02* (2012.01)
*G06Q 10/08* (2012.01)
*G06Q 30/06* (2012.01)

(52) U.S. Cl.
CPC ....... *G06Q 30/0283* (2013.01); *G06Q 10/087* (2013.01); *G06Q 30/0611* (2013.01)

(58) Field of Classification Search
CPC .......... G06Q 30/0283; G06Q 30/0611; G06Q 30/0206; G06Q 50/30; G06Q 10/087; G06F 16/00; G06F 16/27; G06F 16/273; G06F 16/275; G06F 11/2082; H04L 17/00
See application file for complete search history.

(56) References Cited

U.S. PATENT DOCUMENTS

| 7,707,049 B2 * | 4/2010 | Van Cleave ........... G06Q 40/08 705/4 |
| 2004/0030572 A1 | 2/2004 | Campbell |
| 2005/0004805 A1 * | 1/2005 | Srinivasan ......... G06Q 30/0631 705/14.53 |
| 2008/0077530 A1 | 3/2008 | Banas |

(Continued)

FOREIGN PATENT DOCUMENTS

JP 2005352763 A * 12/2005

OTHER PUBLICATIONS

"How to Estimate Moving Cost: A Better Way," by Tom Gerencer, Nov. 15, 2016 (Year: 2016).*

*Primary Examiner* — George Chen
*Assistant Examiner* — Brian Adams Heflin
(74) *Attorney, Agent, or Firm* — Wilson Dutra, PLLC; Camille A. Wilson

(57) ABSTRACT

The present disclosure provides generally for methods and systems relating to relocation estimates. According to the present disclosure, sales representatives and prospective customers may have access to the relocation estimate system to see how a quote is being generated and what the resource allocation was. These parties may make suggestions or ask questions about how a quote was generated. These parties may correct or update a quote based on needs not known during an initial walkthrough. Based on information input by a user, the relocation estimate system may provide a quote in real-time.

17 Claims, 14 Drawing Sheets

(56) References Cited

U.S. PATENT DOCUMENTS

| | | | |
|---|---|---|---|
| 2009/0187622 A1* | 7/2009 | Xie | G06F 16/275 |
| | | | 709/203 |
| 2009/0259565 A1* | 10/2009 | Avisror | G06Q 10/08 |
| | | | 705/26.1 |
| 2013/0132295 A1* | 5/2013 | Horowitz | G06Q 10/08345 |
| | | | 705/330 |
| 2014/0337157 A1* | 11/2014 | Burlin | G06Q 30/0611 |
| | | | 705/26.4 |
| 2014/0344097 A1 | 11/2014 | Horwitz | |
| 2017/0024685 A1 | 1/2017 | DiSorbo | |
| 2017/0053288 A1* | 2/2017 | Golden | H04L 67/02 |
| 2019/0034865 A1* | 1/2019 | Marolli | G06Q 30/0206 |
| 2019/0180209 A1* | 6/2019 | Syed | G06Q 10/06312 |

\* cited by examiner

SYSTEM AND METHODS FOR PROVIDING AND CALCULATING RELOCATION ESTIMATES

CROSS-REFERENCE TO RELATED APPLICATION

This application claims priority to and the full benefit of U.S. Provisional Patent Application Ser. No. 62/610,232 (filed Dec. 24, 2017, and titled "SYSTEM AND METHODS FOR PROVIDING AND CALCULATING RELOCATION ESTIMATES"), the entire contents of which are incorporated here by reference.

BACKGROUND

Traditionally, before a relocation could occur, a sales representative met with a customer and toured the move site to gather information. A sales representative took note of what items needed to be moved, what the origin location looked like, what the destination location looked like, how many people would be moving, and when a customer wanted everything to be executed. Within this walkthrough, there were numerous variables at play when estimating what a relocation could cost or what a move plan could entail. Typically, notes are taken with pen and paper, and a sales representative then spent a considerable amount of time trying to determine what a cost estimate would be to quote the customer. In some instances, a seasoned sales representative could be able to quote a range to a customer, but normally deferred a final, binding price until after having some time to consider everything that would be involved for the move.

There are also situations where a sales representative was not alone during a consultation. Some prospective customers invited several companies to walk a site at the same time, which did not afford the sales representatives the luxury of taking their time to properly account for everything that needed to be done for a relocation. In these instances, speed is the most important skill a sales representative could have, both in taking in information needed to create a quote and also to turn around and produce a quote to the customer before other companies had an opportunity to do so. These auction scenarios tended to happen for bigger customers, giving companies an even bigger impetus to try to provide their best estimate on as short a timeline as possible. For the most part, these practices continue to the present day.

Currently, commercial relocation companies use pen and paper combined with the personal experience of a person to provide an estimate for a relocation. Companies rely on what worked on previous moves or on the skill of their service providers to generate a quote, which normally did not take in to account shifting variables, different customers, or divergent needs. This resulted in quotes that were missing essential information, which would either result in a loss for the company for unforeseen costs or an unanticipated expense for a customer. Based on this, newer sales representatives might lack the training to capture the information necessary for a relocation, resulting in miscalculations on the job. Slow quotes and inaccurate estimates often result in a loss of a client or a project. Further, estimates are typically generated independently by salespeople, and only once a job has been awarded does someone create a work order and move plan for the quoted relocation, which may or may not align with the estimate.

SUMMARY OF THE DISCLOSURE

What is needed is a system and method to provide a customer with a thorough move inventory, fully document scope of services with specific commitments, accurate quote generation, and then connect to a move generation system, which may allow for continuity between a quote for a move and execution of the move. Accordingly, the relocation estimate system in the present disclosure may increase accuracy as well as communication with a client, who may see how a quote was generated, what information a quote was based on, and what an initial move plan for a relocation is going forward. On the other side, the relocation estimate system may allow the sales representative to provide a moving team with an initial outline for a move, which the team may use to more accurately plan how a move might look. For example, the move team may identify the order of business unit moves, establish what needs to be moved in each unit, document what the move list may contain, and communicate that to both the customer and the company to move things forward.

This relocation estimate system may be used by a sales representative to systematically perform a walk-through for prospective customers by electronically capturing and storing all relevant details. At the end of the walk-through, the sales representative may produce a complete quote without going through the time-consuming, repetitive process of estimating that is normally based completely on the experience level of the representative determining the quote. The relocation estimate system may reduce redundancies involved in the estimate approval process, such as eliminating the need for work orders or to generate work orders separately.

The relocation estimate system may be used to track a running total of inventory that needs to be captured, the amount of trucks that may be needed for a move, and calculate and estimate how many workers may be needed for an effective move plan to be implemented. The relocation estimate system may assign a resource value to a move and determine how resources may need to be distributed based on input from sales representatives. The relocation estimate system may also make recommendations based on what a sales representative is capturing in real-time.

Over time, the relocation estimate system may collect data and analyze historic quotes to improve pricing and what services the company may offer. The relocation estimate system may compile historical data and link to a mover's database to see how a previous move went, pull that information into the quote, and update estimates based on any previous inefficiencies or overlooked considerations. The relocation estimate system may analyze previous estimates, compare it to the completed job, and provide more realistic timelines based on previous experience. The relocation estimate system may make recommendations for pricing, potentially accounting for a sales representative's experience level.

In some embodiments, a user may be able to prime a walkthrough or consultation by using the relocation estimate system to input information about an upcoming move and get preliminary pricing for a move. A sales representative may review this information and perform a walkthrough to verify the estimate.

BRIEF DESCRIPTION OF THE DRAWINGS

The accompanying drawings that are incorporated in and constitute a part of this specification illustrate several embodiments of the disclosure and, together with the description, serve to explain the principles of the disclosure:

FIG. 3 illustrates an exemplary GUI of a pricing module, according to some embodiments of the present disclosure.

FIG. 5 illustrates an exemplary GUI of an inventory capture input, according to some embodiments of the present disclosure.

FIG. 6 illustrates an exemplary GUI of a move plan, according to some embodiments of the present disclosure.

DETAILED DESCRIPTION

Figure 1:
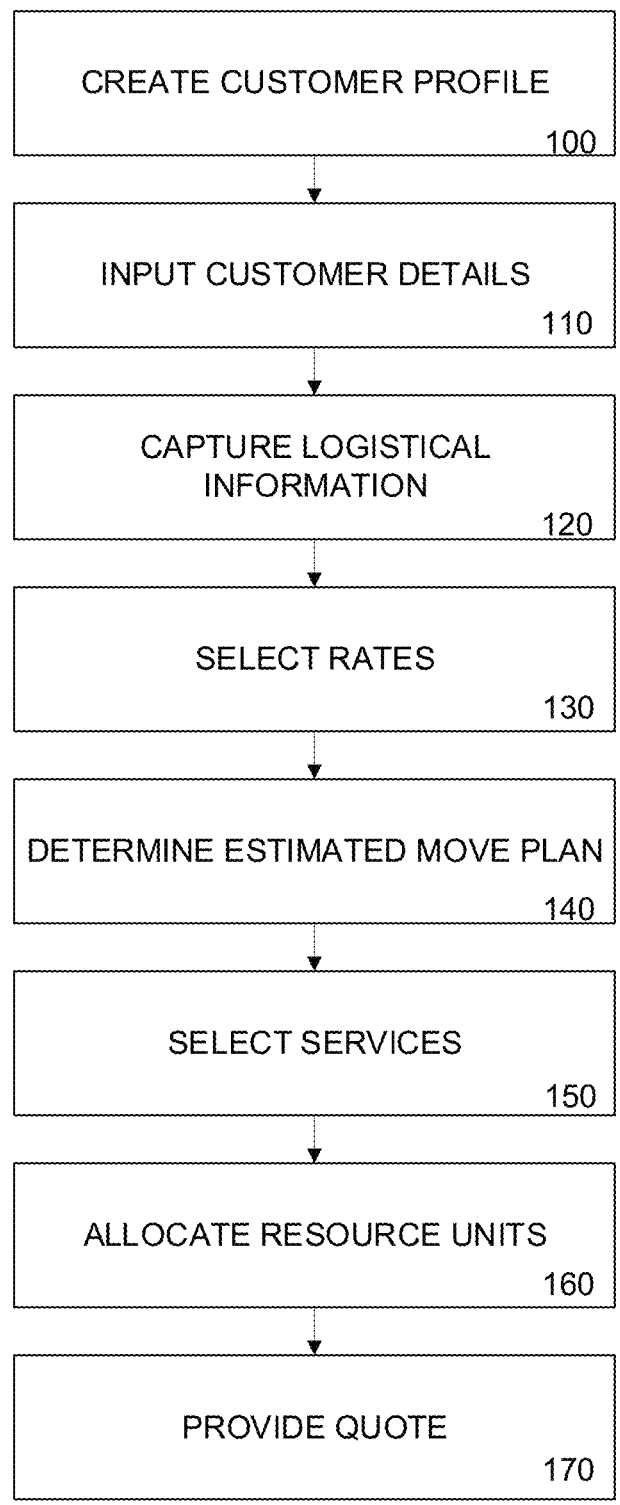
FIG. 1 illustrates an exemplary process flowchart for quote generation, according to some embodiments of the present disclosure.

The present disclosure provides generally for methods and systems relating to relocation estimations. According to the present disclosure, sales representatives and prospective customers may have access to the relocation estimate system to see how a quote is being generated and what the resource allocation was. These parties may make suggestions or ask questions about how a quote was generated. These parties may correct or update a quote based on needs not known during an initial walkthrough. Based on information input by a user, the relocation estimate system may provide a quote in real-time.

In the following sections, detailed descriptions of examples and methods of the disclosure will be given. The description of both preferred and alternative examples, though thorough, are exemplary only, and it is understood to those skilled in the art that variations, modifications, and alterations may be apparent. It is therefore to be understood that the examples do not limit the broadness of the aspects of the underlying disclosure as defined by the claims.

Glossary

Sales representative: as used herein refers to individuals who may provide and develop estimates for customers on behalf of a relocation company.

Customer: as used herein refers to an entity that may hire a relocator.

Relocator: as used herein refers to an entity that may relocate businesses from an origin to a destination. In some aspects, a relocator may provide services beyond simple transportation of inventory, such as set up and break down of technology for the customer. In some aspects, a relocator may relate to other industry providers that may offer project services related to relocation.

Relocation: as used herein refers to a definable project requiring logistic solutions relating to one or more resource unit. In some embodiments, a relocation may comprise moving inventory from an origin to a destination. In some aspects, a relocation may comprise a construction project that may require identifying and pricing material, such as concrete and cranes; labor, such as electricians and plumbers; and inventory, such as appliances and fixtures to be installed.

Quote or Estimate: as used herein, refers to a pricing estimation for a relocation service, wherein the quote or estimate may be provided to a customer prior to an execution of a move.

User: as used herein refers to individuals who may have access privileges to the relocation estimate system.

Resource unit: as used herein refers to resources required to determine what is needed for a move plan. In some aspects, resource units may comprise one or more labor, inventory, or materials. In some embodiments, values and pricing associated with each resource unit may be based on one or more move phases, hours required, logistic requirements, and location data, as non-limiting examples. For example, pricing associated with labor may depend on hours, experience level, origin, and destination.

Relocation Estimate System: as used herein refers to a system configured to develop, calculate, and provide relocation estimates.

Material: as used herein refers to products utilized in a relocation. Materials may comprise move blankets, boxes, dollies, or other items useful for one or both transportation and logistics. In some aspects, materials may comprise consumable products, such as tape, labels, or protective wrapping material, as non-limiting examples.

Inventory: as used herein refers to items that may be included in the relocation. In some embodiments, inventory may comprise furniture, electronics, pallets of goods, equipment, or other transportable items.

The present disclosure relates generally to a system and methods for estimating commercial relocations. More specifically, the disclosure describes a relocation estimate system for capturing information during a walkthrough or during a prospective customer consultation that may provide a complete estimate in real-time based on a sales representative's input. In some embodiments, the relocation estimate system may use a relocator's internal information to generate an estimate or quote. In some implementations, the relocation estimate system may access similar moves to have a base recommendation for the sales representative. In some aspects, the relocation estimate system may access moves from the same customer to provide to the sales representative as a reference point. In some embodiments, the relocation estimate system may access moves from the same customer to integrate into the newest move the relocation estimate system is capturing information for.

This software may combine or automate aspects of the estimation and proposal process. Based on inventory and logistics data entered by a salesperson, the application may provide guidance, estimates, or both for creation of a move plan. Notably, after an initial data sync, the user may operate nearly all features of the app while offline or disconnected.

Upon finalizing a move plan, the system may generate a formal proposal document, allowing for electronic signature. Additionally, the system may interact with the operations or move-coordination system to provide operational information about the scheduled move. The system may interact with a customer resource management ("CRM") system to improve sales and customer data.

Referring now to FIG. 1, an exemplary process flowchart for quote generation is illustrated. At 100, a customer profile may be created, and at 110, customer details may be input. In some aspects, at 110, at least a portion of the customer details may be extracted from a separate or connected data management system, such as a CRM system. In some embodiments, where a new customer may be requesting an estimate, a customer profile created at 100 may be added to a CRM system, which may allow the relocator to better track and manage estimates and customer relations.

At 120, logistical information may be captured. In some implementations, logistical information may relate to one or more the origin, the destination, or the route between the origin and destination. In some aspects, the logistical information may be public information, such as building permit requirements, vehicle height restrictions, or building blueprints; collected information from previous moves from the same or similar locations or clients, such as best parking practices, best move routes, or best building practices; or combinations thereof.

For example, it may be public information that a building permit and a parking permit may be required for certain origins, but from prior move experiences from some of the origins, the relocator may have learned that the parking permit is not for the best access street because of the way the building is structured. The best access street may not require a parking permit. That information may be input or extracted from a logistics database, and the quote generated at 170 may be adjusted to reflect the more efficient move details.

At 130, rates may be selected, wherein a user may customize the pricing based on a range of factors. For example, larger customers with multiple moves may be billed at a different rate than smaller customers or first-time customers. As another example, some rates may fluctuate based on location, wherein navigating through dense city traffic, heavy snow, or narrow roads may require a higher rate to compensate for the potential lost time or requirement for more experienced movers. On some embodiments, the rates may be based in part on the value of the inventory or complexity of the move. For example, the rates may be higher where the inventory comprises primarily of high value items or the move requires a complex break down and set up of complicated electronics and machinery. In some aspects, the rates selected at 130 may partially address some of the nuances of the move, and other steps may further tailor the estimate.

At 140, an estimated move plan may be determined. In some aspects, an estimated move plan may comprise phases, inventory, and move logistics. In some embodiments, complex moves may benefit from dividing the move into phases, such as by area, labor required, or department. In some implementations, phases may be planned for different days or may require different types of movers, which may inherently increase the pricing. At 150, services may be selected, and at 160, resource units may be allocated, wherein the services selected and resource units allocated may be based at least in part on the estimated move plan developed at 140.

In some embodiments, the relocation estimate system may comprise a labor module, which may allow for selection of at least some services. In some aspects, such as where labor hours required to move standard inventory such as boxes, chairs, or computers may be calculated based on quantity, volume, and distance to be moved, as non-limiting examples, the labor module may request input of the relevant factors. For example, fifty different boxes under a certain size may each require approximately the same number of labor hours, and input of the exact size of each box may be less relevant than the total volume of the boxes, which may affect the size and number of trucks needed to accommodate for the volume.

In some aspects, the size and quantity of the inventory may only partially determine the labor hours required, though typically, these variables may be the primary basis for a quote. In some embodiments, the labor module may allow for incorporation of labor hours required for specialized services, which may be required for some inventory. In some implementations, the relocator may provide break down and set up services for certain inventory, such as computers, servers, heavy machinery, or lab equipment, as non-limiting examples. The time and skill required to break down and set up different types of inventory may vary greatly. For example, the skill required to deconstruct and reconstruct a server farm may be vastly different than the skill required to deconstruct and reconstruct machinery in a manufacturing line and vastly different than the skill required to deconstruct and reconstruct gym equipment.

In some implementations, the labor module may allow a salesperson to input inventory details, wherein the relocation estimate system may calculate the labor hours and rates based on those details. In some aspects, the rates may be based at least in part on the skill level required for the labor hours. For example, fifty labor hours for moving simple boxes may cost less than ten hours of technical labor hours for setting up lab equipment. In some embodiments, the relocation estimate system may be connected to an execution platform that may inform the relocation estimate system of the actual hours and skill required for a move. Over time, the relocation estimate system may adapt and learn from the actual move plan to create more accurate and realistic estimated move plans, which may allow for more accurate and dependable estimates.

As an illustrative example, ten different desktop computers, each with no more than three screens and one tower, may require approximately the same number of labor hours to move but may require different hours to break down and set up, and the labor module may separately request the computer details to determine labor hours to move and labor hours to break down and set up. In some moves, the customer may opt to be responsible for the break down and set up of the technology, and the relocation estimate system may allow the salesperson to exclude that service from the quote. The relocation estimate system may allow the salesperson to easily toggle between services, which may allow for presentation of a range of quotes based on the different options.

In some aspects, one or both a salesperson and the relocation estimate system may recognize a need to accommodate for typical variances from an estimated move plan. As an illustrative example, an estimated move plan may identify fifty items of inventory, and one or both the salesperson or the relocation estimate system may recognize that for estimates provided more than two weeks from the actual move for this particular customer, the inventory tends to increase by approximately twenty percent.

At 170, a quote may be provided. In some aspects, quotes may be provided on site, wherein a customer may have the opportunity to accept the quote immediately and digitally sign a move agreement. In some embodiments, the relocation estimate system may be connected to a CRM system, wherein the quote provided at 170 may be transmitted and attached to the customer profile within the CRM system. In some implementations, toggling a status within the CRM system from pending to accepted may trigger the generation of a work order based on the quote developed at 170.

In some embodiments, a sales representative may initiate the estimation process. In some implementations, the relocation estimate system may prompt a sales representative for information. In some aspects, a customer may have access to the relocation estimate system to input information before a consultation. In some embodiments, a customer may see updates made to an estimate in real-time. In some implementations, a customer and a sales representative may have access to the same dashboard.

Figure 2:
FIG. 2 illustrates an exemplary graphical user interface (GUI) of a move plan segmentation, according to some embodiments of the present disclosure.

Referring now to FIG. 2, an exemplary graphical user interface ("GUI") of a move plan segmentation is illustrated. In some embodiments, the relocation estimate system may provide an overview of a move plan. In some implementations, a move plan may be segmented based on a variety of factors, such as by day, resource units required, labor hours required, or by rate. In some aspects, a user may manipulate a segmented move plan to make recommendations to the move plan. In some embodiments, a user may change the move plan as needed. In some implementations, the relocation estimate system may generate a recommended move plan. In some aspects, the relocation estimate system may generate a move plan based on a customer's prior history or prior moves. In some embodiments, the relocation estimate system may generate a move plan based on similar industry moves. For example, technology companies may have more sensitive or confidential equipment to handle that typically takes more resource hours, and the relocation estimate system may account for the special requirements for each move and customer accordingly.

In some embodiments, a user may see building logistics integrated into a move plan segmentation. In some implementations, service categories may have a quick reference guide, such as color coding. In some aspects, a service may be flagged as optional. In some embodiments, a customer can opt in to certain services listed. In some implementations, a move plan summary or proposal may be duplicated for a recurring or future customer. In some aspects, a service category may be created as needed. For example, a customer may have a specific request or need for a move. The customer may then recommend that this service be added to the relocation estimate system or the sales representative may add the service to the estimate directly.

In some embodiments, a summary page may include the scope of services provided. In some implementations, a summary page may indicate what tasks are planned for a move. In some aspects, pricing may be segmented by time and materials or by fixed pricing. In some embodiments, inventory may be organized by phase or altogether.

Figure 3:
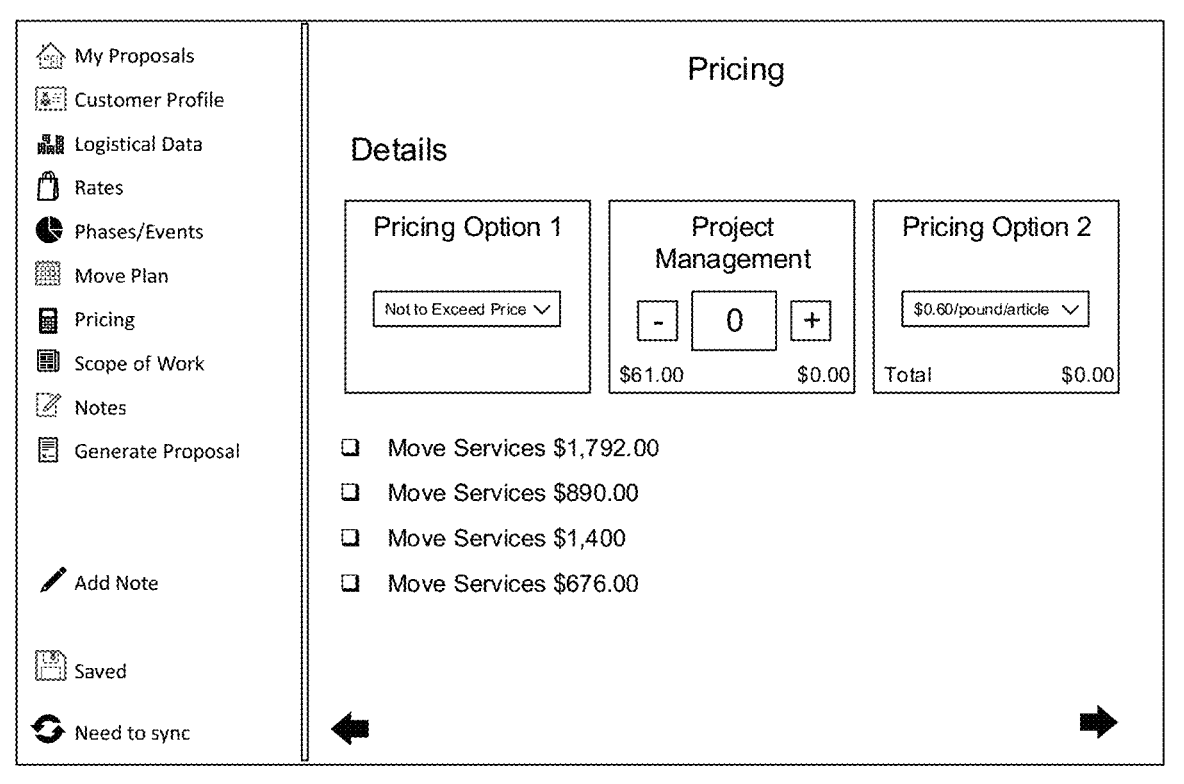

Referring now to FIG. 3, an exemplary GUI of a pricing module is illustrated. In some embodiments, a user may set parameters for pricing. In some implementations, a user may select various pricing options, such as setting a maximum budget for a move. In some aspects, a user may add units that may be required for a move. In some implementations, a user may indicate whether a price is to be based on time and material or by a fixed firm price. In some embodiments, a user may choose a resource unit to add to an estimate. In some implementations, a user may choose pricing parameters for each resource unit. For example, a user may add a quantity of inventory and select an option to estimate inventory relocation fees by weight.

In some aspects, a user may segment pricing as described above based on a day, a phase, labor, or by service, as non-limiting examples. In some embodiments, the relocation estimate system may calculate the variables a user inputs in real-time and output a value or preliminary estimate. In some implementations, a user may indicate what environment the relocation relates to. For example, a user may indicate whether the move involves an office, a warehouse, or relates to an industrial or medical industry.

In some aspects, a user may provide a digital signature. In some embodiments, the relocation estimate system may capture customer information for later use. In some implementations, when a customer agrees to a move, the relocation estimate system may push that information to another team to ready the relocation. In some aspects, quotes may be stored in a CRM system, which may be separated or integrated into the relocation estimate system, wherein the quotes may be one or both viewable and accessible. In some embodiments, a user or relocator may want to view historical data related to quotes. For example, a relocator may be interested to know that twenty quotes have been provided to a customer that only ever agreed to one move. As another example, a relocator may be interested to know that fifty quotes have been provided to a customer, and all quotes below a certain threshold price have been accepted.

Figure 4:
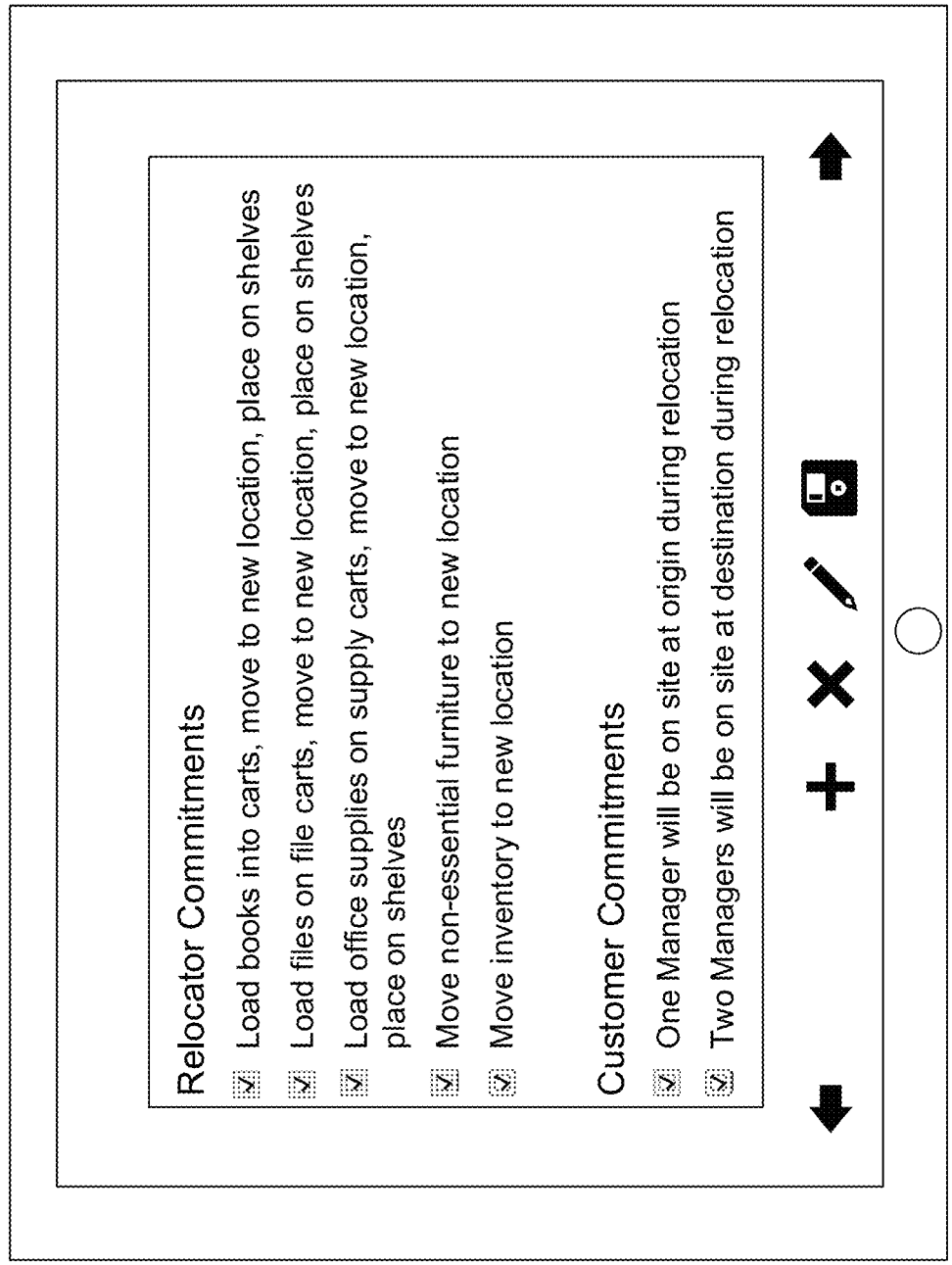
FIG. 4 illustrates an exemplary GUI of a commitment list, according to some embodiments of the present disclosure.

Referring now to FIG. 4, an exemplary GUI of a commitment list is illustrated. In some embodiments, a relocator may create an initial list of commitments for a team to follow during a move. In some implementations, a sales representative may create these requests during a walkthrough or initial consultation. In some aspects, a customer may request certain commitments from a relocator. In some embodiments, the relocation estimate system may populate recommended commitments based on prior experiences with a customer.

In some implementations, the relocation estimate system may generate the commitment requests as a checklist. In some aspects, a user may mark commitments as completed or as an indication that the party agrees to making those commitments. In some embodiments, a customer may also make commitments to the relocator. For example, a customer may state that they will get all authorizations in place for loading bays before a move. In some implementations, once a commitment is agreed to, the relocation estimate system may sort and forward the commitments to the appropriate parties. For example, a customer may agree to notify employees of requirements for a move. The relocation estimate system may provide a customer with a template email that the customer may then send to its employees. Alternatively, a customer may allow the relocation estimate system to send the emails on its own.

Figure 5:
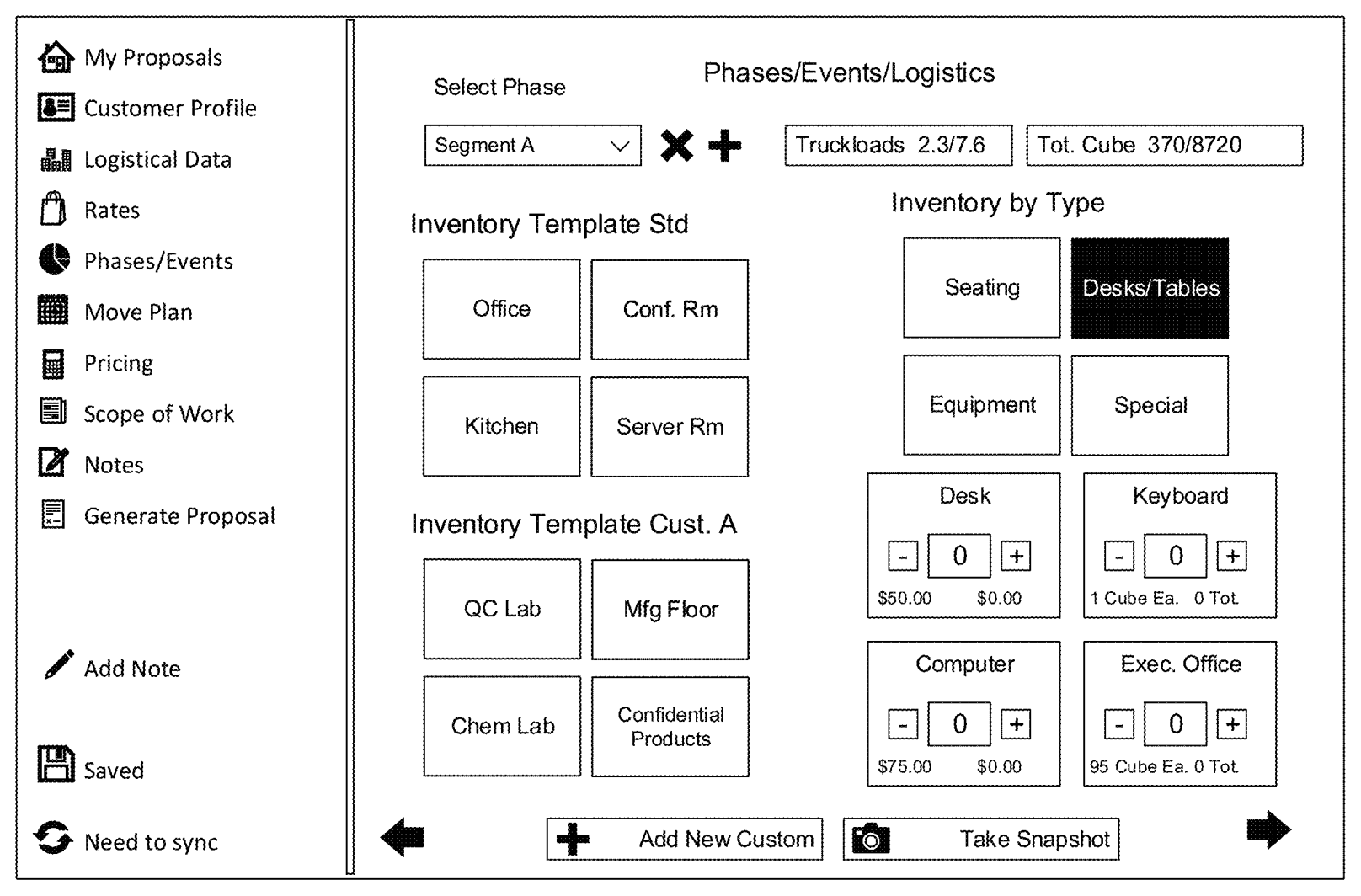

Referring now to FIG. 5, an exemplary GUI of an inventory capture input is illustrated. In some embodiments, the relocation estimate system may have category types of inventory available. For example, a user can indicate what type of inventory is being moved or being installed. In some implementations, a user can write inventory items in free form. In some aspects, the relocation estimate system may add custom items to a master list. In some embodiments, a user may populate an inventory list based on previously entered items. In some implementations, a user may choose inventory items before a walkthrough based on anticipated inventory they plan to capture.

In some aspects, the relocation estimate system may categorize inventory items as a user inputs the information. In some embodiments, a relocation estimate system may segment items by move phase. In some implementations, a relocation estimate system may prioritize items based on customer requests or previous moves. In some aspects, a relocation estimate system may create a move plan based on what inventory is captured.

In some embodiments, a user may be able to easily input inventory by room type, wherein a template inventory may be associated with a room type. In some aspects, selecting a room type may automatically add the room inventory to the move inventory. In some implementations, selecting a room type may expand to show template inventory, which may allow the user to customize the inventory. As an illustrative example, there may be a room template for a conference room that may include chairs, conference table, whiteboard, and projector. The actual inventory for the conference room may comprise ten chairs, one conference table, two whiteboards, a mini refrigerator, and no projector. The room template may allow for quick addition of the standard inventory and direct input of exceptional inventory, such as the mini refrigerator.

In some embodiments, the pricing may adjust in real time as the user changes the inventory. For example, the pricing per item may decrease as the quantity increases. A single chair may cost $50 to move and ten chairs may cost $5 each to move. The chairs may be stackable or easier to move in bulk. In some aspects, a user may be able to toggle between variable views, such as between cube, price, or other variable, as non-limiting examples.

In some embodiments, a user may take a photograph or video of a walkthrough and the relocation estimate system may preliminarily identify inventory items to count and categorize. In some implementations, a user may confirm whether items were accurately captured. In some aspects, a user may request items to be uninstalled, installed, moved, or wall mounted. In some embodiments, the relocation estimate system may assign resource units for inventory items in the background while a user captures inventory.

In some aspects, the relocation estimate system may provide a basic template of normal inventory items based on industry. For example, an office move may include desks, chairs, keyboards, and computer monitors. In some embodiments, a user may toggle a quantity amount or a weight amount to indicate volume of inventory. In some implementations, the relocation estimate system may provide a basic template of normal service items based on industry. For example, an office move may include disconnect and reconnect for technology, desk disassembly, or wall mounting a desk.

Figure 6:
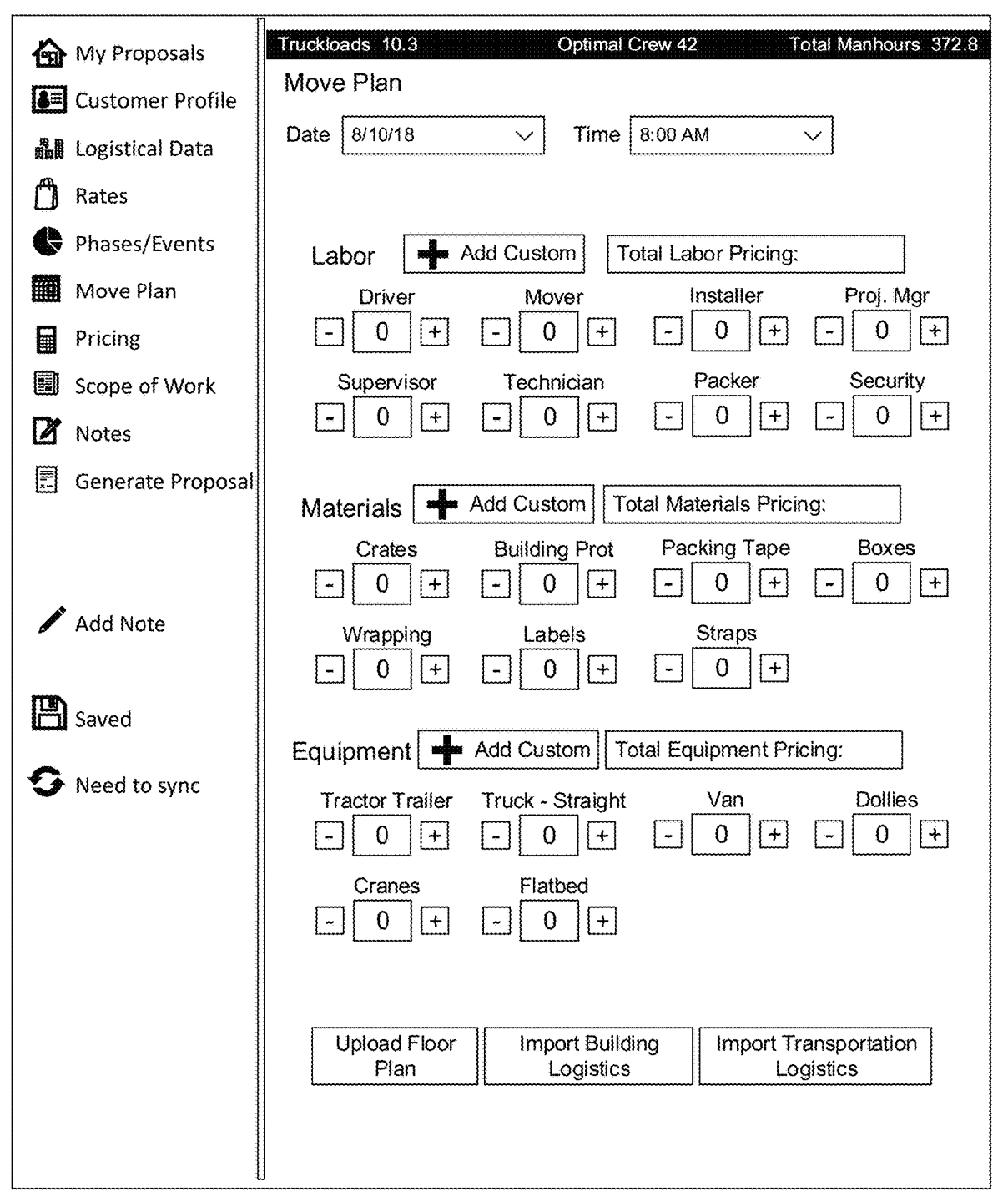

Referring now to FIG. 6, an exemplary GUI of a move plan is illustrated. In some embodiments, a customer may provide dates for a move to occur. In some implementations, a sales representative may capture inventory for a move. In some aspects, a user may input inventory for a move. In some embodiments, a user may input a floor plan for a move. In some aspects, the GUI may allow for upload of one or more floor plans, building logistics, and transportation logistics. In some embodiments, logistical data may correlate to logistical pricing.

As an illustrative example, the inventory may include an oversized item that may be over standard weight limits. The standard route from origin to destination may include low bridges that would inhibit passage. The logistical data may require a longer route, permits for an oversized/overweight load, and an escort. This logistical data may be associated with logistical pricing that would account for the special transportation requirements.

In some implementations, the relocation estimate system may provide a floor plan based on a prior move in the same building. In some aspects, the relocation estimate system may generate a map based on a customer's address. In some implementations, the relocation estimate system may suggest move times based on historic traffic data. For example, relocation planning in a heavily populated city may benefit from a move occurring during slightly off rush hour times, such as 10 a.m. or 7 p.m. In some aspects, the relocation estimate system may provide cross-streets for a user's reference when researching or receiving information on a move.

In some embodiments, a customer may include specific information for accessing a move site. For example, a relocator may need a specific code to access a building for a move. In some implementations, the relocation estimate system may prompt a user for requisite information for a move. In some aspects, the relocation estimate system may prompt a sales representative for more information if prior moves had access issues. For example, if a customer historically requires a permit for loading or unloading, the relocation estimate system may recommend this as a customer commitment.

In some embodiments, a move plan may be divided into categories. For example, a move plan may include resource units, move services, and move materials. In some implementations, a move plan may be divided by day, move phase, or point of origin. In some aspects, a move plan categories may include installation services, equipment delivery, equipment pick-up, move materials, pre-move services, move services, post-move services, hourly special services, flat rate special services, technology services, or vacated space services, as non-limiting examples.

In some aspects, a user may manipulate resource units to finalize an estimate. In some embodiments, a user may reallocate resource units as appropriate. In some implementations, the relocation estimate system may make a recommendation based on prior inputs from a user, such as inventory that needs to be moved, location, or prior moves with a customer. In some aspects, a user can highlight what services might be optional to a customer. In some embodiments, a customer may opt in to particular services. In some implementations, a move plan may indicate an optimal amount of truckloads, crew members, or hours recommended for a move. In some aspects, a user may indicate what a service entails, such as whether something includes a delivery fee.

Figure 7:
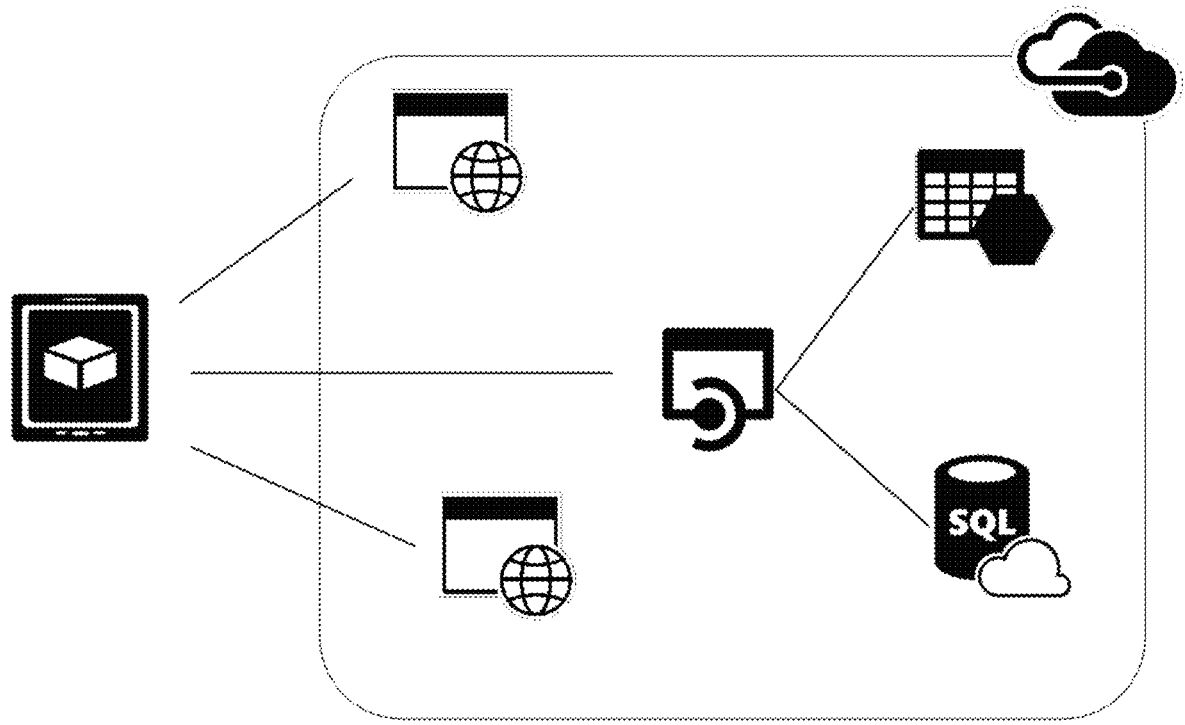
FIG. 7 illustrates an exemplary processing and interface system, according to some embodiments of the present disclosure.

Referring now to FIG. 7, an exemplary processing and interface system is illustrated. In some embodiments, data may be synced between the relocation estimate system and backend storage by an online application programming interface ("API"). In some implementations, data may be synced with a CRM system to seed proposals with account information. In some aspects, completed quotes may be pushed into the CRM system for review for sales representatives. In some embodiments, these applications may have a shared pool of resources using cloud computing. In some implementations, data may be stored in different databases, such as blob storage or a cloud-based database. In some aspects, an administrative hierarchy may be assigned to anyone who accesses the relocation estimate system. In some embodiments, a mobile application and an internet application may interact with one another.

In some embodiments, the relocation estimate system may store or cache information entered by a user. In some implementations, the relocation estimate system may upload entered information when connected to a network. In some aspects, the relocation estimate system may make preliminary calculations without a network connection. In some embodiments, a quote may be updated once the relocation estimate system connects to a network.

Figure 8:
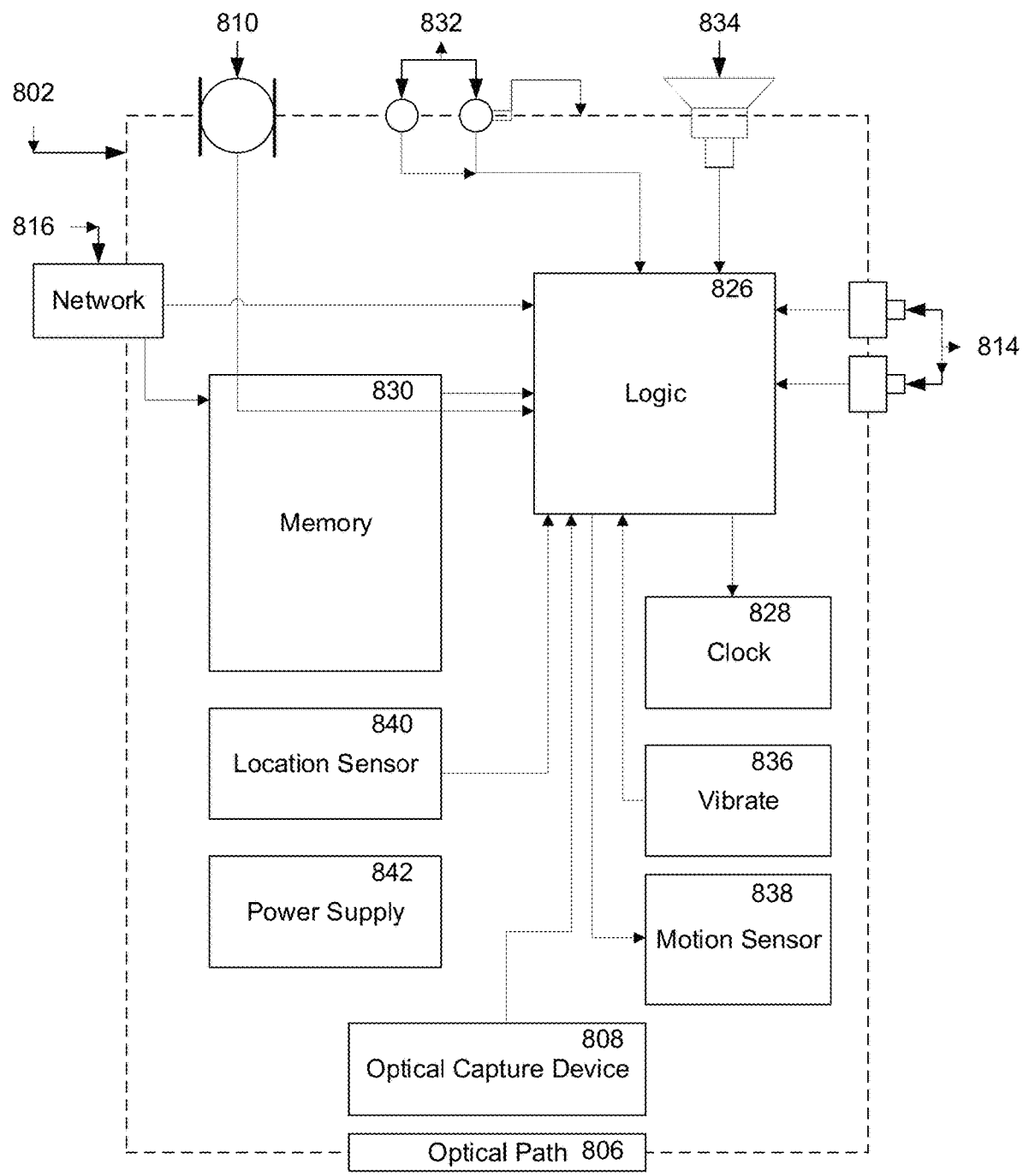
FIG. 8 illustrates an exemplary block diagram of an exemplary embodiment of a mobile device, according to some embodiments of the present disclosure.

Referring now to FIG. 8, an exemplary block diagram of an exemplary embodiment of a mobile device 802 is illustrated. The mobile device 802 may comprise an optical capture device 808, which may capture an image and convert it to machine-compatible data, and an optical path 806, typically a lens, an aperture, or an image conduit to convey the image from the rendered document to the optical capture device 808. The optical capture device 808 may incorporate a Charge-Coupled Device ("CCD"), a Complementary Metal Oxide Semiconductor ("CMOS") imaging device, or an optical sensor of another type.

In some embodiments, the mobile device 802 may comprise a microphone 810, wherein the microphone 810 and associated circuitry may convert the sound of the environment, including spoken words, into machine-compatible signals. Input facilities 814 may exist in the form of buttons, scroll-wheels, or other tactile sensors such as touch-pads. In some embodiments, input facilities 814 may include a touchscreen display. Visual feedback 832 to the user may occur through a visual display, touchscreen display, or indicator lights. Audible feedback 834 may be transmitted through a loudspeaker or other audio transducer. Tactile feedback may be provided through a vibration module 836.

In some aspects, the mobile device 802 may comprise a motion sensor 838, wherein the motion sensor 838 and associated circuitry may convert the motion of the mobile device 802 into machine-compatible signals. For example, the motion sensor 838 may comprise an accelerometer, which may be used to sense measurable physical acceleration, orientation, vibration, and other movements. In some embodiments, the motion sensor 838 may comprise a gyroscope or other device to sense different motions.

In some implementations, the mobile device 802 may comprise a location sensor 840, wherein the location sensor 840 and associated circuitry may be used to determine the location of the device. The location sensor 840 may detect Global Position System ("GPS") radio signals from satellites or may also use assisted GPS where the mobile device may use a cellular network to decrease the time necessary to determine location. In some embodiments, the location sensor 840 may use radio waves to determine the distance from known radio sources such as cellular towers to determine the location of the mobile device 802. In some embodiments these radio signals may be used in addition to and/or in conjunction with GPS.

In some aspects, the mobile device 802 may comprise a logic module 826, which may place the components of the mobile device 802 into electrical and logical communication. The electrical and logical communication may allow the components to interact. Accordingly, in some embodiments, the received signals from the components may be processed into different formats and/or interpretations to allow for the logical communication. The logic module 826 may be operable to read and write data and program instructions stored in associated storage 830, such as RAM, ROM, flash, or other suitable memory. In some aspects, the logic module 826 may read a time signal from the clock unit 828.

In some embodiments, the mobile device 802 may comprise an on-board power supply 832. In some embodiments, the mobile device 802 may be powered from a tethered connection to another device, such as a Universal Serial Bus ("USB") connection.

In some implementations, the mobile device 802 may comprise a network interface 816, which may allow the mobile device 802 to communicate and/or receive data to a network and/or an associated computing device. The network interface 816 may provide two-way data communication. For example, the network interface 816 may operate according to an internet protocol. As another example, the network interface 816 may comprise a local area network (LAN) card, which may allow a data communication connection to a compatible LAN. As another example, the network interface 816 may comprise a cellular antenna and associated circuitry, which may allow the mobile device to communicate over standard wireless data communication networks. In some implementations, the network interface 816 may comprise a Universal Serial Bus (USB) to supply power or transmit data. In some embodiments, other wireless links known to those skilled in the art may also be implemented.

Figure 9:
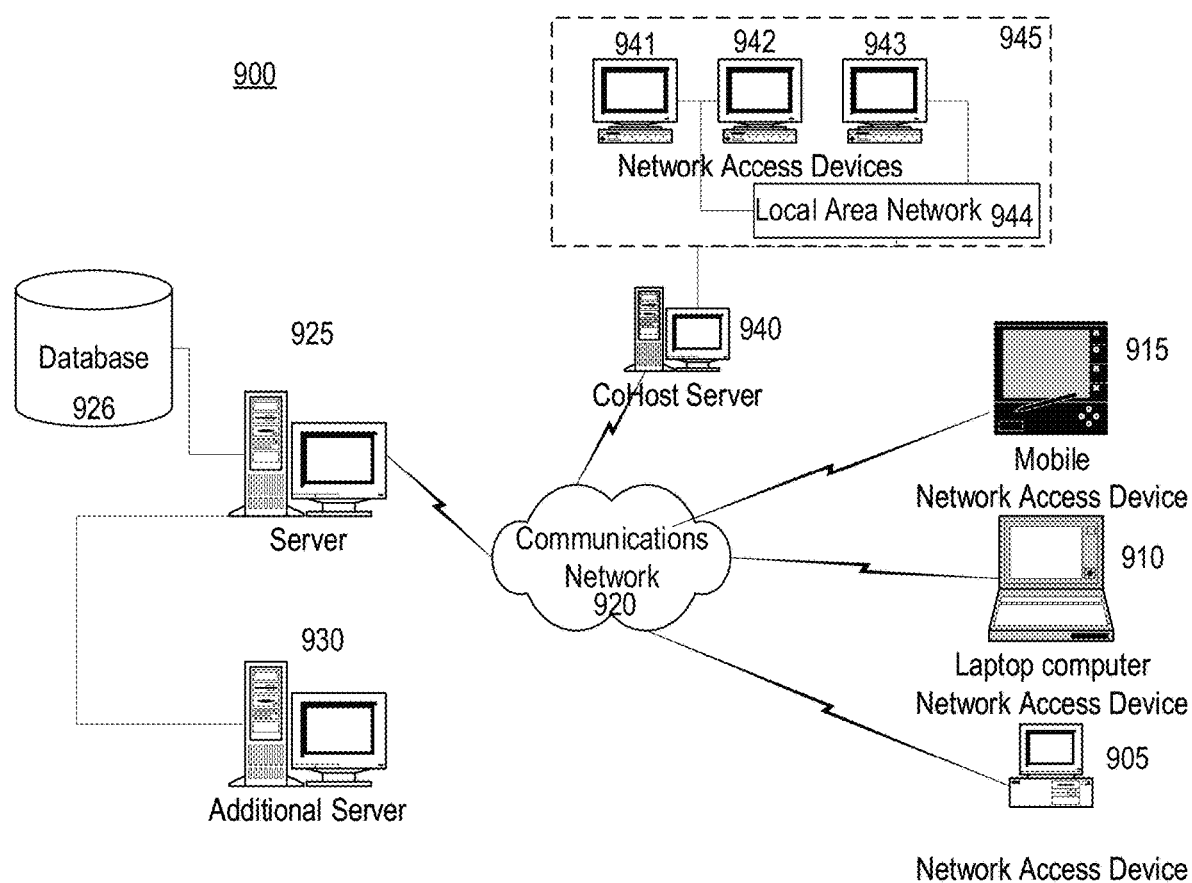
FIG. 9 illustrates an exemplary processing and interface system, according to some embodiments of the present disclosure.

Referring now to FIG. 9, an exemplary processing and interface system 900 is illustrated. In some aspects, access devices 915, 910, 905, such as a paired portable device 915 or laptop computer 910 may be able to communicate with an external server 925 though a communications network 920. The external server 925 may be in logical communication with a database 926, which may comprise data related to identification information and associated profile information. In some embodiments, the server 925 may be in logical communication with an additional server 930, which may comprise supplemental processing capabilities.

In some aspects, the server 925 and access devices 905, 910, 915 may be able to communicate with a cohost server 940 through a communications network 920. The cohost server 940 may be in logical communication with an internal network 945 comprising network access devices 941, 942, 943 and a local area network 944. For example, the cohost server 940 may comprise a payment service, such as PayPal or a social network, such as Facebook or LinkedIn.

Figure 10:
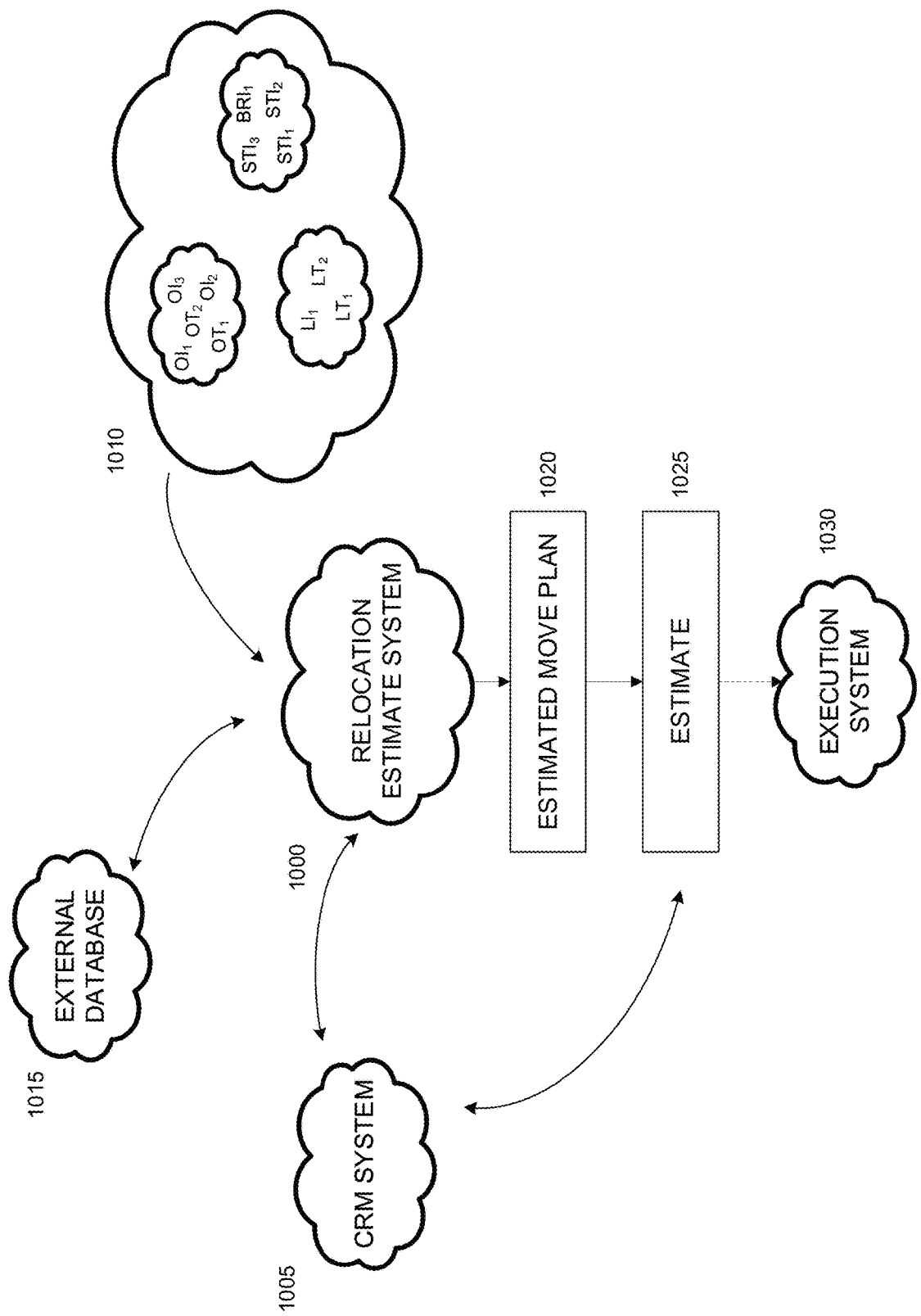
FIG. 10 illustrates an exemplary relocation estimate system diagram, according to some embodiments of the present disclosure.

Referring now to FIG. 10, an exemplary relocation estimate system 1000 diagram is illustrated. In some aspects, such as described in FIG. 1, a relocation estimate system 1000 may interface with a CRM system 1005, such as to input or extract customer information. In some embodiments, move details 1010 may be input into the relocation estimate system 1000, such as inventory, origin, or destination. In some implementations, the relocation estimate system 1000 may interface with an external database 1015, such as public systems, customer systems, or other relocator systems.

In some aspects, the relocation estimate system 1000 may generate an estimated move plan 1020 and an estimate 1025 based on the estimated move plan 1020. In some embodiments, the relocation estimate system 1000 may interface with an execution system 1030, which may generate a work order and implement a move plan. In some implementations, the execution system 1030 may receive move information when a customer has agreed to an estimate and the relocator has been awarded the move.

Figure 11:
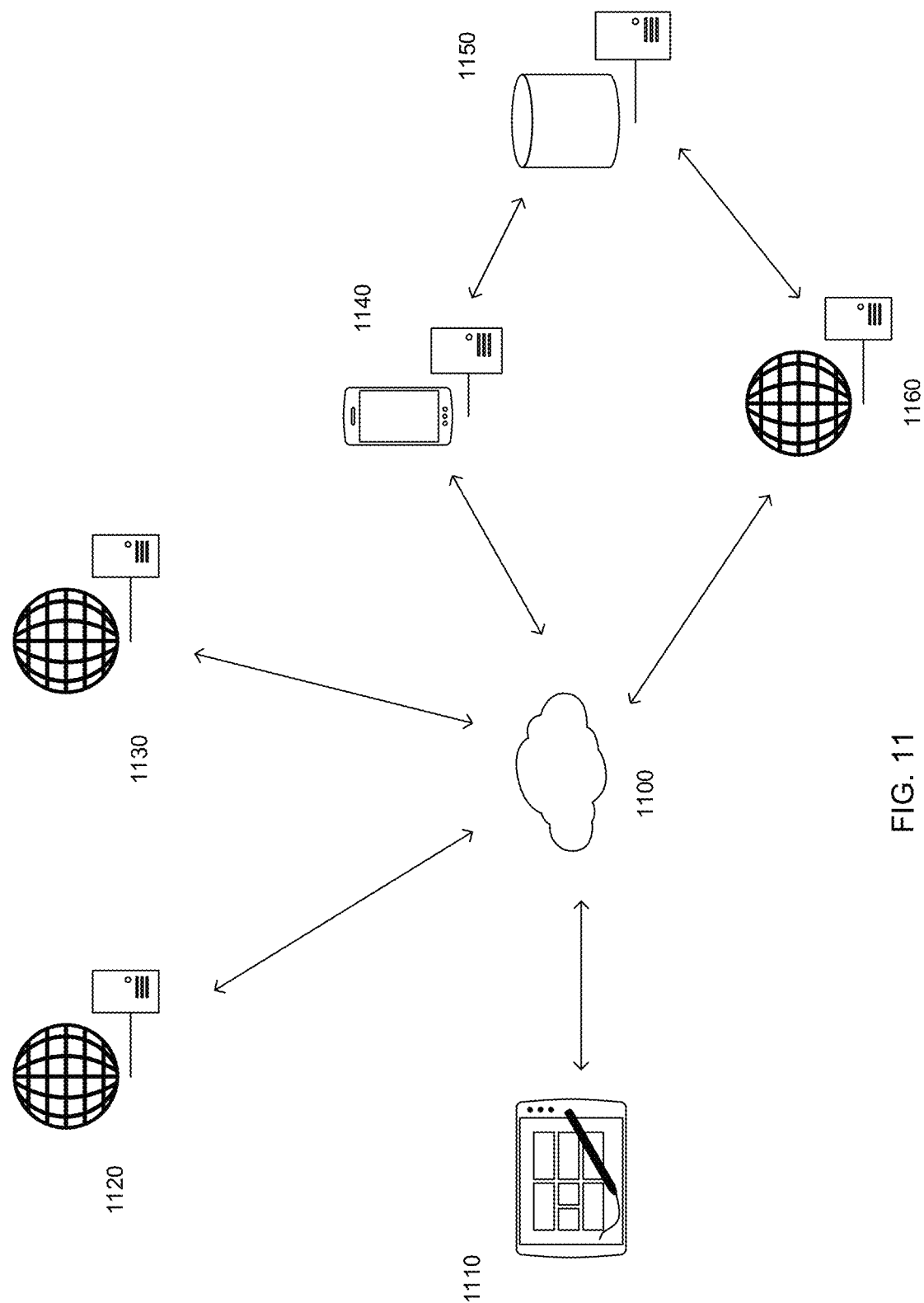
FIG. 11 illustrates an exemplary relocation estimate system, according to some embodiments of the present disclosure.

Referring now to FIG. 11, an exemplary relocation estimate system is illustrated. In some aspects, a relocation estimate system may exchange data and communicate through a cloud-computing service 1100. In some embodiments, a user may utilize a local computing device 1110 and input a proposal request for a relocation quote, wherein the relocation quote may comprise at least one price estimate for a relocation. In some aspects, the local computing device 1110 may communicate with system databases 1150 through one or both a mobile application API 1140 and web portal 1160.

In some implementations, the relocation estimate system may interface with one or both a CRM platform 1120 and an operations platform 1130. In some aspects, such as when the relocation estimate system may interface with an operations platform 1130, the relocation estimate system may generate work orders based on a proposal, such as once a customer agrees to the terms of the proposal. In some implementations, generating a work order based off an accepted proposal may limit the need for repeated input of a move plan, which may reduce error and time required to proceed from proposal to execution of a move plan.

In some embodiments, such as when the relocation estimate system may interface with a CRM platform 1120, the relocation system may associate proposals and proposal requests with customer profiles. Associating proposals and proposal requests with customer profiles may allow for a better understanding of what a customer values or needs for relocations. The relocation estimate system may identify overlapping characteristics between the proposals.

As illustrative examples, a customer may request thirty proposals and only accept five, and the reasons behind the acceptance and rejections may be discerned when compared to each other within the customer profile. The five accepted proposals may all involve a particular manager, a particular user, a particular department, or particular urgency. The customer may only accept proposals as a last resort when the relocation must occur within a shortened time period. Alternatively, the customer may only accept proposals when there is an extended time period. The customer may only accept proposals under a certain price. In some aspects, correlating proposal details with a customer profile may provide useful insight into how to market to that customer.

Figure 12:
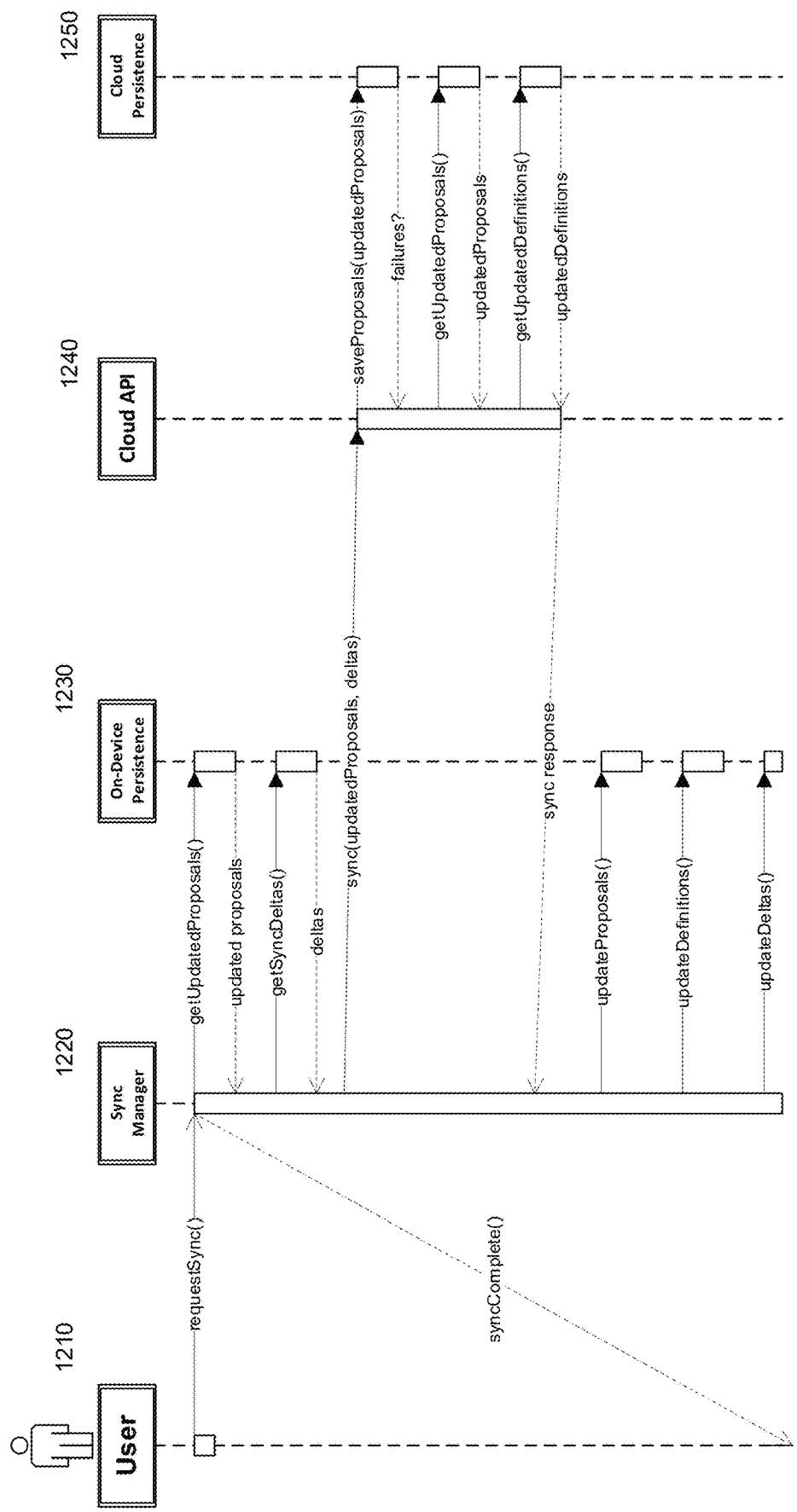
FIG. 12 illustrates an exemplary synchronization data flow diagram, according to some embodiments of the present disclosure.

Referring now to FIG. 12, an exemplary synchronization data flow diagram is illustrated. In some aspects, a user 1210 may engage with a local computing device to generate a proposal request, wherein the proposal request may be stored as a proposal data packet on on-device persistence 1230. In some embodiments, a sync manager 1220 may initiate synchronization of proposal data packets stored on on-device persistence 1230 with memory resources on cloud persistence 1250, wherein at least a portion of synchronization occurs through a cloud API 1240.

In some implementations, the sync manager 1220 may identify deltas between proposal data packets stored on on-device persistence 1230 and cloud persistence 1250, such as where a proposal request may include updated parameters, a new proposal request is generated, a proposal is created in response to a proposal request, or a proposal is updated, as non-limiting examples. Where deltas may be identified, the sync manager 1220 may access those proposal data packets with new information and update the proposal data packets located on one or both the on-device persistence 1230 and the cloud persistence 1250.

In some aspects, a proposal data packet may be treated as a single object, wherein the variables associated with the proposal request and proposal may be considered contained within the proposal data packet. In some embodiments, three realm files may be created, which may include proposals, template, and sync support. In some implementations, the proposal realm file may treat each proposal data packet as a transaction, wherein syncing may validate which proposal data packet was updated or added per a sync support realm file. In some embodiments, syncing may occur when new data, updated data, or both may be identified. In some aspects, syncing by proposal data packet may limit upload of partial proposal requests and proposals.

Figure 13:
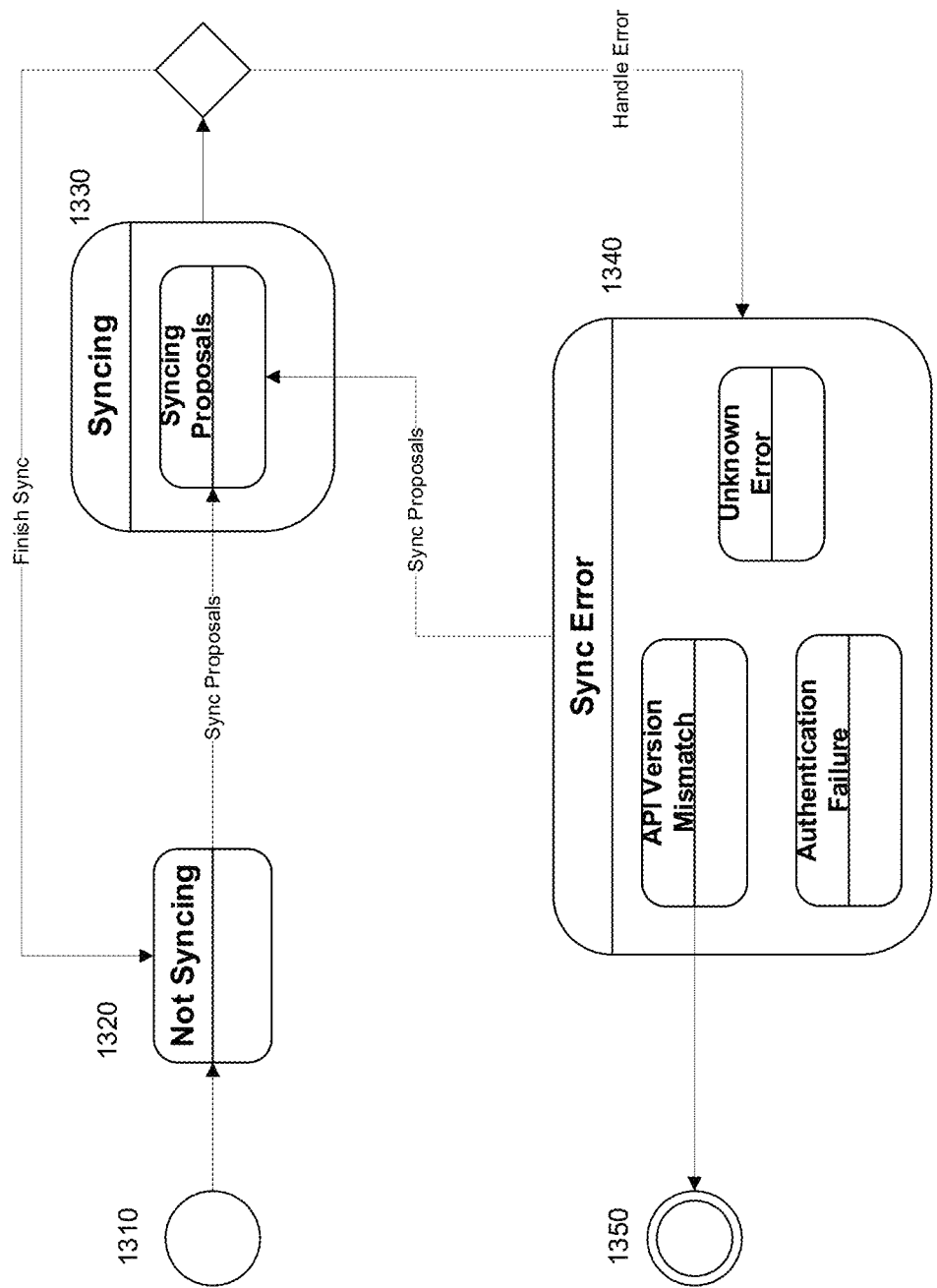
FIG. 13 illustrates an exemplary synchronization flow diagram, according to some embodiments of the present disclosure.

Referring now to FIG. 13, an exemplary synchronization flow diagram is illustrated. At 1310, a proposal data packet may be generated locally on a local computing device, such as a tablet, smartphone, or laptop, as non-limiting examples. At 1320, the local computing device may not be syncing, such as because the device is offline, in power-saving mode, or sync has been disabled. At 1330, syncing may be initiated, wherein synchronization may occur in bulk for each proposal data packet. In some aspects, initially, a proposal data packet may comprise a relocation description, origin, destination, estimated inventory, and move dates. Accordingly, in some aspects, multiple proposal data packets may comprise multiple relocation description, origins, destination, estimated inventories, and move dates.

In some embodiments, synchronization may occur by proposal data packet, in contrast to utilizing a relational database, where each object within the proposal data packet may be synced in a table independently of each other, which may allow for syncing of partial information for a proposal data packet. In some implementations, when syncing multiple proposal data packets, a syncing error for a portion of a single proposal data packet may return a complete sync failure for the individual proposal data packet and allow for continued syncing of the remaining proposal data packets.

At 1340, a sync error may occur, and the system may revert or loop back to the syncing step at 1330. In some embodiments, a sync error may occur for one or more reasons, such as an API version mismatch, an authentication failure, or an unknown error, as non-limiting examples. In some aspects, the sync error type may be transmitted back to the user, which may allow the user to correct the error, such as by inputting the correct authentication credentials, updating an API, or another resolution, as non-limiting examples. At 1350, a proposal data packet may be synced to an external memory source.

Figure 14:
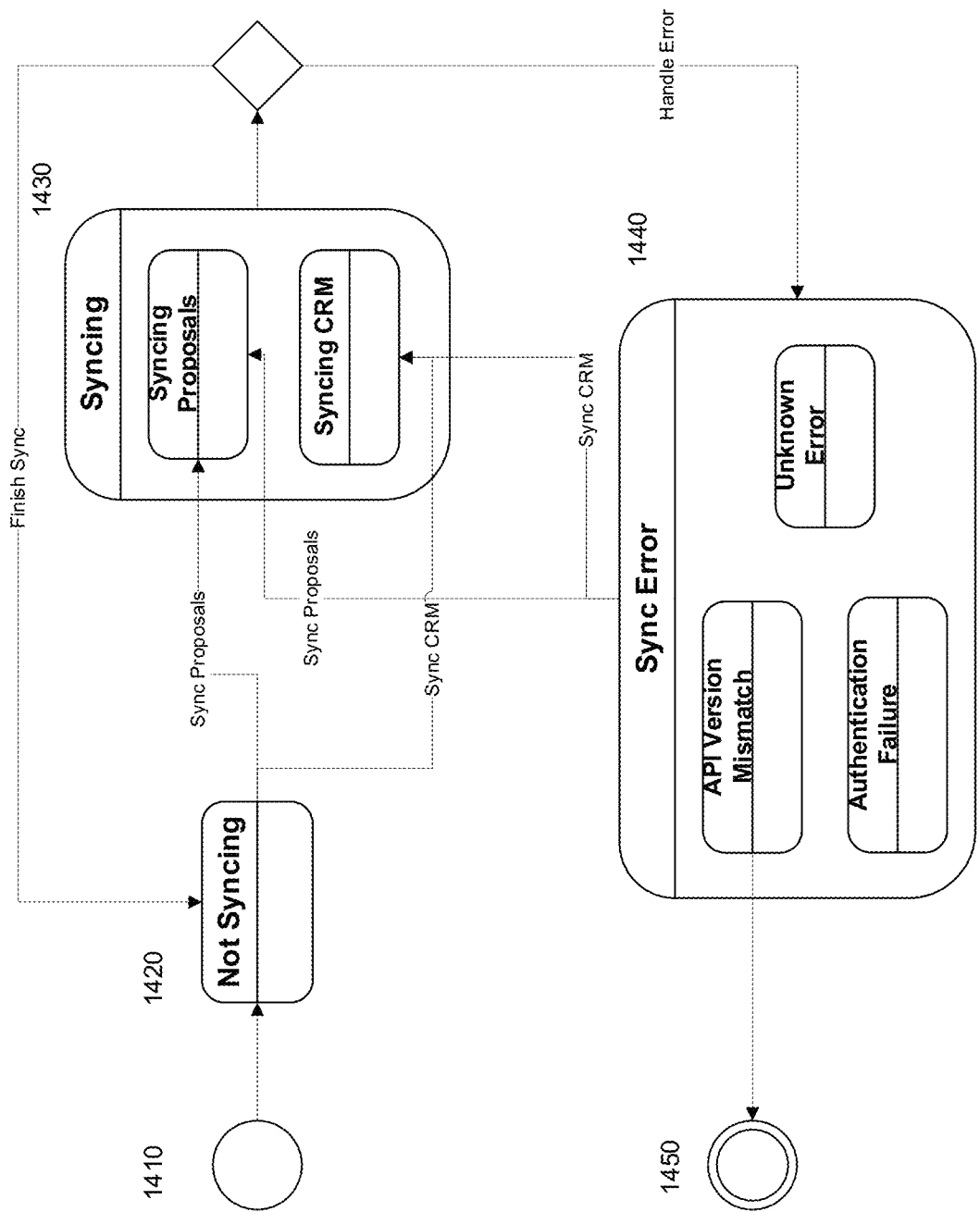
FIG. 14 illustrates an exemplary synchronization flow diagram, wherein the synchronization interfaces with an external customer resource management ("CRM") system.

Referring now to FIG. 14, an exemplary synchronization flow diagram is illustrated, wherein the synchronization interfaces with an external CRM system. At 1410, a proposal data packet may be generated locally on a local computing device, such as a tablet, smartphone, or laptop, as non-limiting examples. At 1420, the local computing device may not be syncing, such as because the device is offline, in power-saving mode, or sync has been disabled. At 1430, syncing may be initiated, wherein synchronization may occur in bulk for each proposal data packet. In some embodiments, a relocation estimate system may logically interface with a CRM platform, wherein syncing at 1430 may sync CRM data to a CRM platform or database. In some implementations, CRM data may be extracted from proposal data packets and synced independently. In some aspects, proposal data packets may be synced with a CRM platform, which may allow for the storage and correlation of proposal requests and proposals to customer profiles.

At 1440, a sync error may occur, and the system may loop back to the syncing step at 1330. In some embodiments, a sync error may occur for one or more reasons, such as an API version mismatch, an authentication failure, or an unknown error, as non-limiting examples. In some aspects, the sync error type may be transmitted back to the user, which may allow the user to correct the error, such as by inputting the correct authentication credentials, updating an API, or other resolution, as non-limiting examples. At 1450, a proposal data packet may be synced to an external memory source.

CONCLUSION

A number of embodiments of the present disclosure have been described. While this specification contains many specific implementation details, these should not be construed as limitations on the scope of any disclosures or of what may be claimed, but rather as descriptions of features specific to particular embodiments of the present disclosure.

Certain features that are described in this specification in the context of separate embodiments can also be implemented in combination or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. A system for estimating relocations comprising:
a plurality of local computing devices couplable to an internet computer network, wherein each of the plurality of local computing devices generates one or more proposal requests for relocation quotes comprising at least one price estimate, wherein each proposal request is stored as a proposal data packet on a local computing device that generated the proposal request;
one or more memory resources comprising:
a proposal data packet database comprising synchronized data packets received from the plurality of local computing devices;
an inventory database comprising inventory data and inventory pricing data, wherein the inventory data is associated with inventory pricing;
a materials database comprising materials data and materials pricing data, wherein the materials data is associated with materials pricing; and
a labor database comprising a plurality of labor classifications and labor pricing, wherein the plurality of labor classifications is associated with the labor pricing, wherein the one or more memory resources are configured to receive communication with an external execution platform, wherein the external execution platform informs one or more of the inventory database, the materials database, and the labor database as relate to labor requirements associated with moves;
a remote server coupled to the one or more memory resources and an internet computer network, wherein the remote server is configured to:
communicate with a first local computing device, wherein the first local computing device comprises one of the plurality of local computing devices, and wherein a communication occurs when the first local computing device is coupled to the internet computer network;
receive a first proposal data packet from the first local computing device;
identify from the first proposal data packet a first proposal request for a first relocation quote, wherein the first proposal request comprises at least a first customer, a first origin, a first destination, a requested move date, and an estimated inventory;
associate an estimated move plan with the first proposal data packet, wherein the estimate move plan is based on one or more the first origin, the first destination, the requested move date, and the estimated inventory;
access the one or more memory resources;
associate the estimated move plan with a first set of labor classifications, a first set of materials, and a first set of inventory;
aggregate a first set of labor pricing data associated with the first set of labor classifications, a first set of materials pricing associated with the first set of materials, a first set of inventory pricing associated with the estimated inventory, and a first set of location pricing associated with one or more the first origin, the first destination, and the requested move date;
create a first proposal estimating a first relocation quote based on the first set of labor pricing data, the first set of inventory pricing, first set of materials pricing, and the first set of location pricing data;
identify from the first proposal data packet CRM data related to a customer profile; and
synchronize with an external CRM databases, wherein synchronization syncs CRM data to the external CRM databases.

2. The system of claim 1, wherein the remote server is further configured to logically interface with an external customer management system.

3. The system of claim 1, wherein the remote server is further configured to generate a work order based on the first relocation quote and the estimated move plan.

4. The system of claim 1, wherein the estimated move plan is received from the first local computing device.

5. The system of claim 1, where the remote server is further configured to generate the estimated move plan.

6. The system of claim 1, wherein the remote server is further configured to associate the estimated move plan with a first set of logistical data, wherein the estimated move plan is further based on the first set of logistical data.

7. The system of claim 6, wherein the one or more memory resources further comprise a logistical database comprising logistical data and logistical pricing data, wherein the logistical data is associated with logistical pricing, and wherein the remote server is further configured to aggregate a first set of logistical pricing associated with the first set of logistical data, and wherein the first relocation quote is further based on the first set of logistical pricing.

8. The system of claim 1, wherein the one or more memory sources further comprise a proposal database, and wherein the remote server is further configured to:
communicate with each of the plurality of local computing devices, wherein a communication occurs when each computing device is coupled to the internet computer network;
identify new proposal data packets stored on one or more of the plurality of local computing devices, wherein the new proposal data packets comprise new proposal requests;
identify updated proposal data packets stored on one or more of the plurality of local computing devices, wherein the updated proposal data packets comprise updated proposal requests; and
synchronize the new proposal data packets and the updated proposal data packets with the one or more memory resources.

9. The system of claim 8, wherein the remote server is further configured to:
identify the new proposal data packets and the updated proposal data packets that fail to synchronize with the one or more memory resources; and
transmit a failure notification to each of the plurality of local computing devices with one or more new proposal data packets and the updated proposal data packets that fail to synchronize.

10. A method for estimating relocations comprising the method steps of:
communicating with a first local computing device, wherein the first local computing device comprises one of a plurality of local computing devices couplable to an internet computer network, wherein each of the plurality of local computing devices generates one or more proposal requests for relocation quotes comprising at least one price estimate, wherein each proposal request is stored as a proposal data packet on a local computing device that generated the proposal request, and wherein the communication occurs when the first local computing device is coupled to a computer network;
receiving a first proposal data packet from the first local computing device;
identifying from the first proposal data packet a first proposal request for a first relocation quote, wherein the first proposal request comprises at least a first customer, a first origin, a first destination, a requested move date, and an estimated inventory;
associating an estimated move plan with the first proposal data packet, wherein the estimated move plan is based on one or more the first origin, the first destination, the requested move date, and the estimated inventory;
accessing one or more memory resources, wherein the one or more memory resources comprise one or more of:
a proposal data packet database comprising synchronized data packets received from the plurality of local computing devices;
an inventory database comprising inventory data and inventory pricing data, wherein the inventory data is associated with inventory pricing;
a materials database comprising materials data and materials pricing data, wherein the materials data is associated with materials pricing; and
a labor database comprising a plurality of labor classifications and labor pricing, wherein the plurality of labor classifications is associated with the labor pricing, wherein one or more the inventory database, the labor database, or the materials database is based at least in part on a predictive data set related to a plurality of prior executed moves, and wherein the one or more memory resources are configured to receive communication with an external execution platform, wherein the external execution platform informs one or more of the inventory database, the materials database, and the labor database as one or more of the inventory database, the materials database, and the labor database relate to labor requirements associated with moves;
associating the estimated move plan with a first set of labor classifications, a first set of materials, and a first set of inventory;
aggregating a first set of labor pricing data associated with the first set of labor classifications, a first set of materials pricing associated with the first set of materials, a first set of inventory pricing associated with the estimated inventory, and a first set of location pricing associated with one or more of the first origin, the first destination, and the requested move date;
creating a first proposal estimating a first relocation quote based on the first set of labor pricing, the first set of inventory pricing, the first set of materials pricing, and the first set of location pricing data;
identifying from the first proposal data packet CRM data related to a customer profile; and
synchronizing with an external CRM system, wherein synchronization syncs the CRM data to the external CRM system.

11. The method of claim 10, wherein the method steps further comprise:
generating a work order based on the first relocation quote and the estimated move plan.

12. The method of claim 10, wherein the estimated move plan is received from the first local computing device.

13. The method of claim 10, wherein the method steps further comprise:
generating the estimated move plan.

14. The method of claim 10, wherein the one or more memory resources further comprise a logistical database comprising logistical data and logistical pricing data, wherein the logistical data is associated with logistical pricing, and wherein the method steps further comprise:
aggregating a first set of logistical pricing associated with a first set of logistical data, wherein the first relocation quote is further based on the first set of logistical pricing.

15. The method of claim 10, wherein the method steps further comprise:
associating the estimated move plan with a first set of logistical data, wherein the estimated move plan is further based on the first set of logistical data.

16. The method of claim 10, wherein the one or more memory sources further comprise a proposal database, and wherein the method steps further comprise:

communicating with each of the plurality of local computing devices, wherein the communication occurs when each computing device is coupled to the computer network;

identifying new proposal data packets stored on one or more of the plurality of local computing devices, wherein the new proposal data packets comprise new proposal requests;

identifying updated proposal data packets stored on one or more of the plurality of local computing devices, wherein the updated proposal data packets comprise updated proposal requests; and synchronize the new proposal data packets and the updated proposal data packets with the one or more memory resources.

17. The method of claim 16, wherein the method steps further comprise:

identifying the new proposal data packets and the updated proposal data packets that fail to synchronize with the one or more memory resources; and transmitting a failure notification to each of the plurality of local computing devices with the one or more new proposal data packets and the updated proposal data packets that fail to synchronize.

\* \* \* \* \*